United States Patent
Eyring et al.

(10) Patent No.: US 11,328,261 B2
(45) Date of Patent: May 10, 2022

(54) SYSTEM AND METHODS FOR HOME AUTOMATION SYSTEM CALENDAR COORDINATION

(71) Applicant: Vivint, Inc., Provo, UT (US)

(72) Inventors: Matthew J. Eyring, Provo, UT (US); Jeremy B. Warren, Draper, UT (US); James E. Nye, Alpine, UT (US)

(73) Assignee: VIVINT, INC., Provo, UT (US)

(*) Notice: Subject to any disclaimer, the term of this patent is extended or adjusted under 35 U.S.C. 154(b) by 1103 days.

(21) Appl. No.: 14/818,874

(22) Filed: Aug. 5, 2015

(65) Prior Publication Data
US 2017/0039476 A1  Feb. 9, 2017

(51) Int. Cl.
*G06Q 10/10* (2012.01)
(52) U.S. Cl.
CPC .............. *G06Q 10/1093* (2013.01)
(58) Field of Classification Search
CPC .................................... G06Q 10/1093
See application file for complete search history.

(56) References Cited

U.S. PATENT DOCUMENTS

| | | | | |
|---|---|---|---|---|
| 7,124,087 B1* | 10/2006 | Rodriguez | ............ | G06Q 10/02 705/5 |
| 7,752,188 B2* | 7/2010 | Lagerstedt | ............ | G01W 1/02 702/3 |
| 7,925,525 B2* | 4/2011 | Chin | ............ | G06Q 10/109 340/539.13 |
| 8,069,417 B2* | 11/2011 | Brush | ............ | G06Q 10/1093 705/7.18 |
| 8,406,162 B2 | 3/2013 | Haupt et al. | | |
| 8,423,288 B2* | 4/2013 | Stahl | ............ | G01C 21/362 701/411 |
| 8,812,136 B2 | 8/2014 | Martin-Cocher et al. | | |
| 10,261,528 B2* | 4/2019 | Kramer | ............ | G05D 23/1905 |
| 2006/0168592 A1* | 7/2006 | Andrews | ............ | G06Q 10/10 719/318 |
| 2006/0255931 A1* | 11/2006 | Hartsfield | ............ | G08B 13/19656 340/538.11 |
| 2007/0043687 A1 | 2/2007 | Bodart et al. | | |
| 2011/0267367 A1* | 11/2011 | Tsai | ............ | G06F 9/451 345/629 |
| 2013/0159377 A1 | 6/2013 | Nash | | |

(Continued)

OTHER PUBLICATIONS

Myllärniemi, Varvana, et al. "Meeting scheduling across heterogeneous calendars and organizations utilizing mobile devices and cloud services." Proceedings of the 13th International Conference on Mobile and Ubiquitous Multimedia. ACM, 2014.*

(Continued)

*Primary Examiner* — Daniel T Pellett
(74) *Attorney, Agent, or Firm* — Kunzler Bean & Adamson, PC

(57) ABSTRACT

A method for security and/or automation systems is described. In one example, the method may include receiving scheduling data associated with a schedule for each of two or more users at a home automation system. The method may further include comparing the received scheduling data for each of the two or more users, and deriving an alert based, at least in part, on the comparing. The method may further include communicating the alert to at least one of the two or more users.

20 Claims, 7 Drawing Sheets

(56) References Cited

U.S. PATENT DOCUMENTS

| | | | | |
|---|---|---|---|---|
| 2013/0218622 A1* | 8/2013 | MacKenzie | ........ | G06Q 10/1093 705/7.19 |
| 2014/0365107 A1* | 12/2014 | Dutta | .................. | G01C 21/343 701/408 |
| 2015/0074259 A1 | 3/2015 | Ansari et al. | | |
| 2015/0142313 A1* | 5/2015 | Haberman | ......... | G01C 21/3415 701/533 |
| 2015/0149227 A1* | 5/2015 | Sar | ................. | G06Q 10/063114 705/7.15 |
| 2015/0199653 A1* | 7/2015 | Cili | ................... | G06Q 10/1095 705/7.19 |
| 2016/0165038 A1* | 6/2016 | Lim | ................. | H04M 1/72533 715/728 |
| 2016/0205238 A1* | 7/2016 | Abramson | ......... | G01C 21/3641 455/456.4 |
| 2016/0232131 A1* | 8/2016 | Liu | ....................... | G06Q 10/06 |
| 2016/0308686 A1* | 10/2016 | Vijayrao | ............ | H04L 12/2809 |

OTHER PUBLICATIONS

Tullio, Joe, et al. "Augmenting shared personal calendars." Proceedings of the 15th annual ACM symposium on User interface software and technology. ACM, 2002.*

Klein, Alexander, Chad Craun, and Robert S. Lee. "Airport delay prediction using weather-impacted traffic index (WITI) model." 29th Digital Avionics Systems Conference. IEEE, 2010. (Year: 2010).*

\* cited by examiner

SYSTEM AND METHODS FOR HOME AUTOMATION SYSTEM CALENDAR COORDINATION

BACKGROUND

The present disclosure, for example, relates to security and/or automation systems, and more particularly to systems and methods for home automation system calendar coordination for two or more users.

Security and automation systems are widely deployed to provide various types of communication and functional features such as monitoring, communication, notification, and/or others. These systems may be capable of supporting communication with a user through a communication connection or a system management action.

Typical families struggle to keep track of and coordinate schedules among each member of the household, and to stay apprised of each family member's location at any given time. While some smartphone applications may allow for calendar synchronization among multiple users, and other, separate applications may allow for monitoring the location of an individual user at any given time, there is lacking a single, collective application operable to synchronize, monitor, update, and otherwise maintain schedules for multiple users in a household. In addition, there is lacking a means by which this application may be used in conjunction with a home automation system, such that users may input and receive scheduling updates without the need to interact with their smartphones directly.

SUMMARY

Existing systems and applications may allow for individually monitoring, updating, and synching user schedules; monitoring traffic or weather conditions; or monitoring a location of one or more users. However, this may require a user to monitor a plurality of applications at any given time in order to obtain all of the information needed to keep track of his own and his family members' schedules. In an effort to streamline the process of organizing schedules, therefore, it may be desirable to provide a method for security and/or automation systems, where the method may include receiving scheduling data associated with a schedule for each of two or more users at a home automation system and comparing the received scheduling data for each of the two or more users. The method may further include deriving an alert based, at least in part, on the comparing, and communicating the alert to at least one of the two or more users. Each step of this method may be performed automatically by the home automation system, or in response to an inputted user request, such that each member of the household may be kept apprised of scheduling, traffic, weather, and location updates without the need to interact with a smartphone or application directly.

For example, a user getting ready for work in the morning may have a 9:00 am meeting on her calendar. The home automation system may receive this scheduling data from, for example, the user's calendar application on her personal computer or smartphone. The home automation system may then automatically pull third-party data related to any of the current weather, traffic, driving or public transportation routes, and the like, to determine the amount of time needed for the user to reach her meeting. The home automation system may also pull historical data related to commuting times from a memory in order to estimate the time needed for the user to reach her meeting. In pulling this third-party data, the home automation system may detect that an accident has occurred along the user's anticipated route to her appointment, causing an increase in commuting time such that she will need to leave her home in the next 10 minutes in order to reach her appointment on time. Accordingly, the home automation system may communicate an alert to the user, for example in the form of a visual or auditory message broadcasted from or displayed at any of the user's smartphone, personal computer, and/or a control panel in the home, in order to alert the user that she must leave for her appointment in the next 10 minutes. In this way, the user may remain apprised of pertinent scheduling information without the need to actively monitor a plurality of scheduling and commuting factors or applications.

In some examples, an alert regarding a first user's schedule may be communicated to a second user. For example, a parent may receive an alert that her son's soccer game has been canceled. The home automation system may detect, for example, using various occupancy detection means, that the parent is at home, and may further receive information from the parent and/or son's calendar that the soccer game is scheduled for 5:00 pm. The home automation system may receive an update from the son's calendar that the game has been canceled, and may accordingly communicate an alert, for example in the form of a visual or auditory message to the parent at a control panel in the home, that the parent does not need to leave for the soccer game, as it has been canceled. The home automation system may additionally detect the location of the son, so that the alert may also include current location information so that the parent knows where to pick up his son.

In some examples, a user may request scheduling information from the home automation system. For example, a user standing near a control panel in his home may speak a verbal command, such as, "Vivint, what is on my schedule today?" or the like, or may alternatively input a command at the control panel related to his schedule. The home automation system may accordingly provide the requested information to the user, along with any pertinent third-party information, such as weather or traffic data, or locations of other family members, or the like.

In some examples, the home automation system may determine an identity of the user issuing the auditory command by utilizing any known voice recognition technology, for example by comparing the detected audio to stored audio files that have been previously associated with known occupants of the home. In some examples, the home automation system may utilize alternate system components to assist in identifying the user issuing the auditory command. For example, facial recognition technology may be used in conjunction with video monitoring systems. In some examples, alternate bioidentifiers may be used. In other examples, the home automation system may detect RFID, Bluetooth, Wi-Fi, or other wireless signals emitted from a user's smartphone, where the smartphone has been previously paired and authenticated with the home automation system. In this way, the home automation system may identify the user speaking the command and may provide scheduling information specific to that user, without the need for direct user input.

In any example, user scheduling data and third-party data may be updated in real-time so that users may remain apprised of changes in scheduling, commuting times, and user locations at all times. For example, a husband expecting his wife home from the office by 6:00 pm may receive an alert from the home automation system notifying him that his wife has been delayed due to traffic, and will be home 30 minutes late, such that he may reschedule their dinner reservation. The system may be able to monitor the wife's location via, for example, global positioning systems in her smartphone, and may receive traffic data from a third-party data source, such as, for example, GOOGLE MAPS™.

The home automation system may also draw from a memory of historical commuting data and traffic data in order to predict a commuting time for various users. For example, where a user has a meeting scheduled downtown at 1:00 pm, the home automation system may pull historical data relating to past trips by the user to the same or a similar destination, and may further pull historical data relating to typical traffic patterns at that time of day, along that particular route. Accordingly, the home automation system may derive a predicted commuting time, and may use this information to provide an alert to the user when the time has come for him to leave for his appointment, to ensure that he arrives at his appointment on time.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

For busy families juggling multiple schedules, coordinating activities and generally keeping up to date on each other's constantly changing plans may present a logistical issue. With the addition of changing weather and traffic patterns, coordinating schedules may be practically impossible. Accordingly, it may be desirable to provide a means by which schedules for multiple household members may be tracked and updated on a real-time basis, and may be presented centrally at a home automation system control panel, or remotely at a user computing device or smartphone. Additionally, providing alerts in real-time to notify family members of changes in each other's schedules and timing for arriving to appointments, all in a centralized system, may be useful. The present disclosure therefore provides a comprehensive system for coordinating multiple users' calendars, gathering third-party data relevant to transit and arrival times, and presenting users with up-to-the-minute alerts, so that families may stay on top of their own and each other's schedules.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
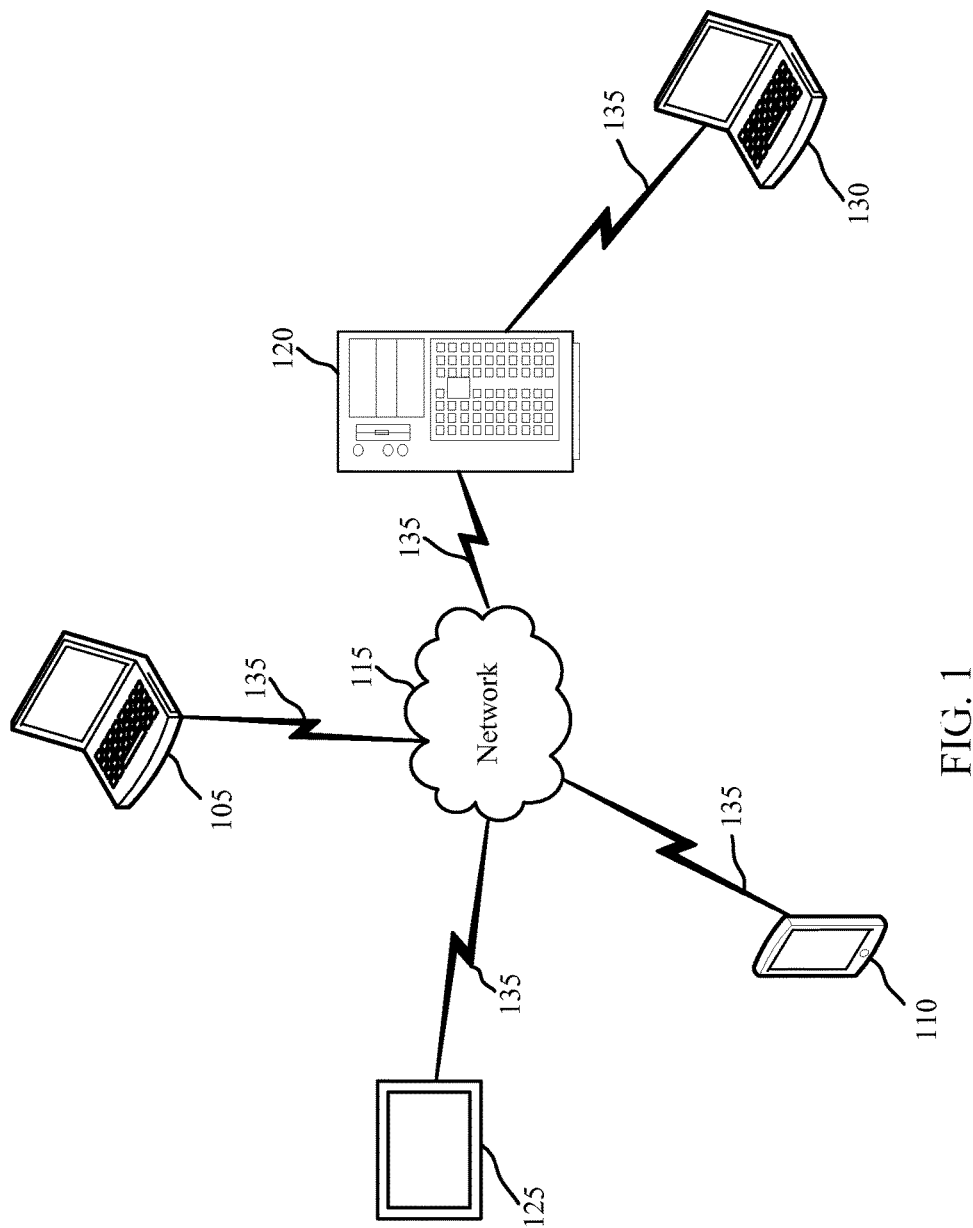
FIG. 1 shows a block diagram relating to a security and/or an automation system, in accordance with various aspects of this disclosure.

FIG. 1 is an example of a communications system 100 in accordance with various aspects of the disclosure. In some embodiments, the communications system 100 may include one or more local computing devices 105, 110, network 115, server 120, control panel 125, and remote computing device 130. One or more of the local computing devices 105, 110 or control panel 125 may communicate via wired or wireless communication links 135 with network 115. The network 115 may communicate via wired or wireless communication links 135 with the control panel 125 and the remote computing device 130 via server 120. In alternate embodiments, the network 115 may be integrated with any one of the local computing device 105, 110, server 120, or remote computing device 130, such that separate components are not required.

Local computing device 105, 110 and remote computing device 130 may be custom computing entities configured to interact with control panel 125 via network 115, and in some embodiments, via server 120. In other embodiments, local computing device 105, 110 and remote computing device 130 may be general purpose computing entities such as a personal computing device; for example, a desktop computer, a laptop computer, a netbook, a tablet personal computer (PC), a control panel, an indicator panel, a multi-site dashboard, an iPod®, an iPad®, a smartphone, a mobile phone, a personal digital assistant (PDA), and/or any other suitable device operable to send and receive signals, store and retrieve data, and/or execute modules.

Control panel 125 may be a smart home system panel; for example, an interactive panel mounted on a wall in a user's home. Control panel 125 may be in direct communication via wired or wireless communication links 135 with the local computing devices 105, 110 and network 115, or may receive data via remote computing device 130, server 120, and network 115.

The local computing devices 105, 110 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 105, 110 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, deriving and displaying an alert associated with one or more users' schedules.

The processor of the local computing devices 105, 110 may be operable to control operation of the output of the local computing devices 105, 110. The output may be a television, a liquid crystal display (LCD) monitor, a cathode ray tube (CRT) monitor, speaker, tactile output device, and/or the like. In some embodiments, the output may be an integral component of the local computing devices 105, 110. Similarly stated, the output may be directly coupled to the processor. For example, the output may be the integral display of a tablet and/or smartphone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 105, 110 to the output.

Personal computing devices 105, 110 may include one or more dedicated applications containing information associated with one or more of the device user's schedule or location. For example, a smartphone having a calendar application may include information related to the user's schedule, and a mapping application may monitor the user's current location. Personal computing devices 105, 110 may also include information related to one or more other users' schedules and/or locations, again using one or more dedicated applications. In addition or alternatively, personal computing devices 105, 110 may receive and display data associated with one or more user's schedule and/or location based on data stored on and received from a server 120 or network 115, for example on a cloud or other internet-based server.

The remote computing device 130 may be a computing entity operable to enable a remote user to input data associated with one or more users' schedules and/or to receive alerts associated with one or more users' schedules. The remote computing device 130 may be functionally and/or structurally similar to the local computing devices 105, 110 and may be operable to receive data streams from and/or send signals to at least one of the local computing devices 105, 110 or control panel 125 via the network 115. The network 115 may be the Internet, an intranet, a personal area network, a local area network (LAN), a wide area network (WAN), a virtual network, a telecommunications network implemented as a wired network and/or wireless network, etc. The remote computing device 130 may receive and/or send signals over the network 115 via communication links 135 and server 120.

In some embodiments, local computing device 105, 110 may communicate with remote computing device 130 or control panel 125 via network 115 and server 120. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 115 may include the Internet. In some embodiments, a user may access the functions of local computing device 105, 110 from remote computing device 130. For example, in some embodiments, remote computing device 130 may include a mobile application that interfaces with one or more functions of local computing device 105, 110.

The server 120 may be configured to communicate with the local computing devices 105, 110, the remote computing device 130, and the control panel 125. The server 120 may perform additional processing on signals received from local computing devices 105, 110, or may simply forward the received information to the remote computing device 130 and control panel 125.

Server 120 may be a computing device operable to receive data streams (e.g., from local computing device 105, 110 or remote computing device 130), store and/or process data, and/or transmit data and/or data summaries (e.g., to remote computing device 130). For example, server 120 may receive a stream of scheduling data for a first user from a local computing device 105, a stream of scheduling data for a second user from a local computing device 110, and a stream of traffic data from a remote computing device 130. In some embodiments, server 120 may "pull" the data streams, e.g., by querying the local computing devices 105, 110 and/or the control panel 125. In some embodiments, the data streams may be "pushed" from the local computing devices 105, 110 to the server 120. For example, the local computing device 105, 110 may be configured to transmit data as it is generated by or entered into that device. In some instances, the local computing devices 105, 110 may periodically transmit data (e.g., as a block of data or as one or more data points). In some examples, server 120 may pull user scheduling and/or third-party data from a user's email application, for example by querying the email server for message content related to scheduled, re-scheduled, or canceled appointments or events. In other examples, server 120 may pull user scheduling and/or third-party data from a social media source; for example, a user may update his FACEBOOK™ status with his current location, and server 120 may pull the user's current location therefrom in order to determine routes and timing for reaching next appointments. Other social media sources, such as news sites or TWITTER™, may also be queried by, or may push data to, the server 120 to provide updated user or third-party data.

The server 120 may include a database (e.g., in memory) containing scheduling data or third-party data received from the local computing devices 105, 110. Server 120 may additionally contain data associated with historical user data, for example showing patterns in appointment times and locations, usual daily wake-up times, regularly traveled transit routes or modes of transportation, traffic patterns along the regularly traveled routes, and the like. Additionally, as described in further detail herein, software (e.g., stored in memory) may be executed on a processor of the server 120. Such software (executed on the processor) may be operable to cause the server 120 to monitor, process, summarize, present, and/or send a signal associated with user scheduling data.

Figure 2:
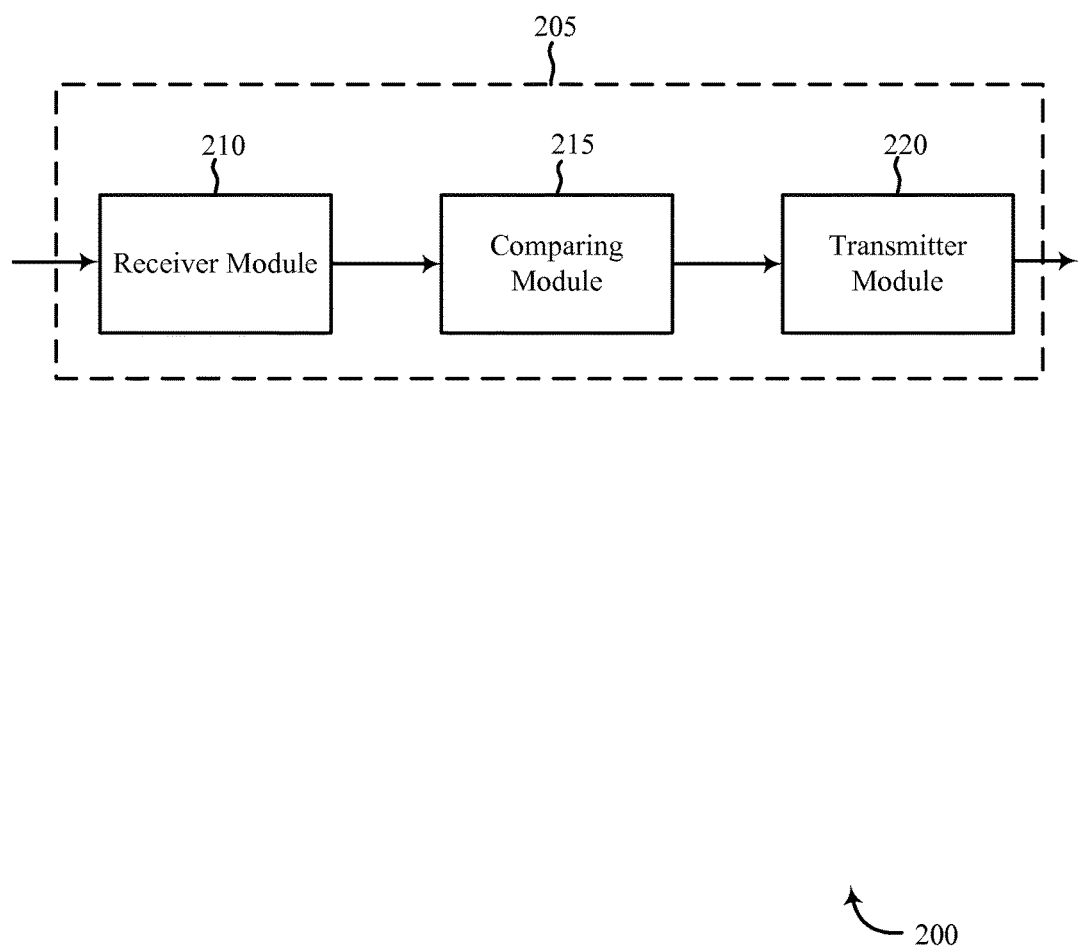
FIG. 2 shows a block diagram of a device relating to a security and/or an automation system, in accordance with various aspects of this disclosure.

FIG. 2 shows a block diagram 200 of an apparatus 205 for use in security and/or automation systems, in accordance with various aspects of this disclosure. The apparatus 205 may be an example of one or more aspects of a control panel 125, or may alternatively be an example of one or more aspects of any of local computing device 105, 110 or remote computing device 130, as described with respect to FIG. 1. The apparatus 205 may include a receiver module 210, a comparing module 215, and/or a transmitter module 220. The apparatus 205 may also be or include a processor. Each of these modules may be in communication with each other—directly and/or indirectly.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive scheduling data associated with one or more users from any of a local computing device, remote computing device, network, or server, as discussed above with respect to FIG. 1. In addition, receiver module 210 may receive third-party data, such as weather, traffic, user location, or other relevant information, from any of the local computing device, remote computing device, network, or server. Information received at receiver module 210 may be passed on to the comparing module 215, and to other components of the apparatus 205.

The comparing module 215 may receive the scheduling data associated with the one or more users and/or the third-party data, and may compare the received data accordingly in order to derive one or more alerts. For example, comparing module 215 may receive a first user's schedule from the user's personal computing device via receiver module 210, indicating that the first user has an appointment at 2:00 pm. Comparing module 215 may additionally receive third-party data, for example traffic data from a traffic or map application or website, indicating that an accident has occurred along the route usually traveled by the first user in order to reach the location of his 2:00 pm appointment. Comparing module 215 may compare the first user's schedule data with the third-party traffic data, and determine that the user must leave 15 minutes earlier than he would usually leave in order to reach his appointment on time. Accordingly, comparing module 215 may derive an alert notifying the user of the need to leave early for his appointment. This derived alert may then be communicated to the transmitter module 220 for delivery to the user.

The transmitter module 220 may transmit the one or more signals received from other components of the apparatus 205. In particular, the transmitter module 220 may transmit the derived alert received from comparing module 215 to one or more users. In one example, the alert may be transmitted to the first user in the form of a visual or auditory message, or haptic alert, received at the first user's personal computing device or smartphone. In other examples, the alert may be transmitted to one or more control panel associated with the user's home automation system. In still other examples, the alert may be transmitted to one or more other users interested in scheduling notifications associated with the first user. For example, scheduling changes associated with John may be transmitted to his wife, Jennifer, to notify her that John will be home late due to a late-running meeting or traffic. In some examples, alerts may be transmitted by transmitter module 220 as they are received or derived, while in other examples, alerts or schedule status updates may be provided in response to a received user query, for example at a dedicated application on her smartphone or at a control panel for the home automation system. In some examples, the transmitter module 220 may be collocated with the receiver module 210 in a transceiver module.

Figure 3:
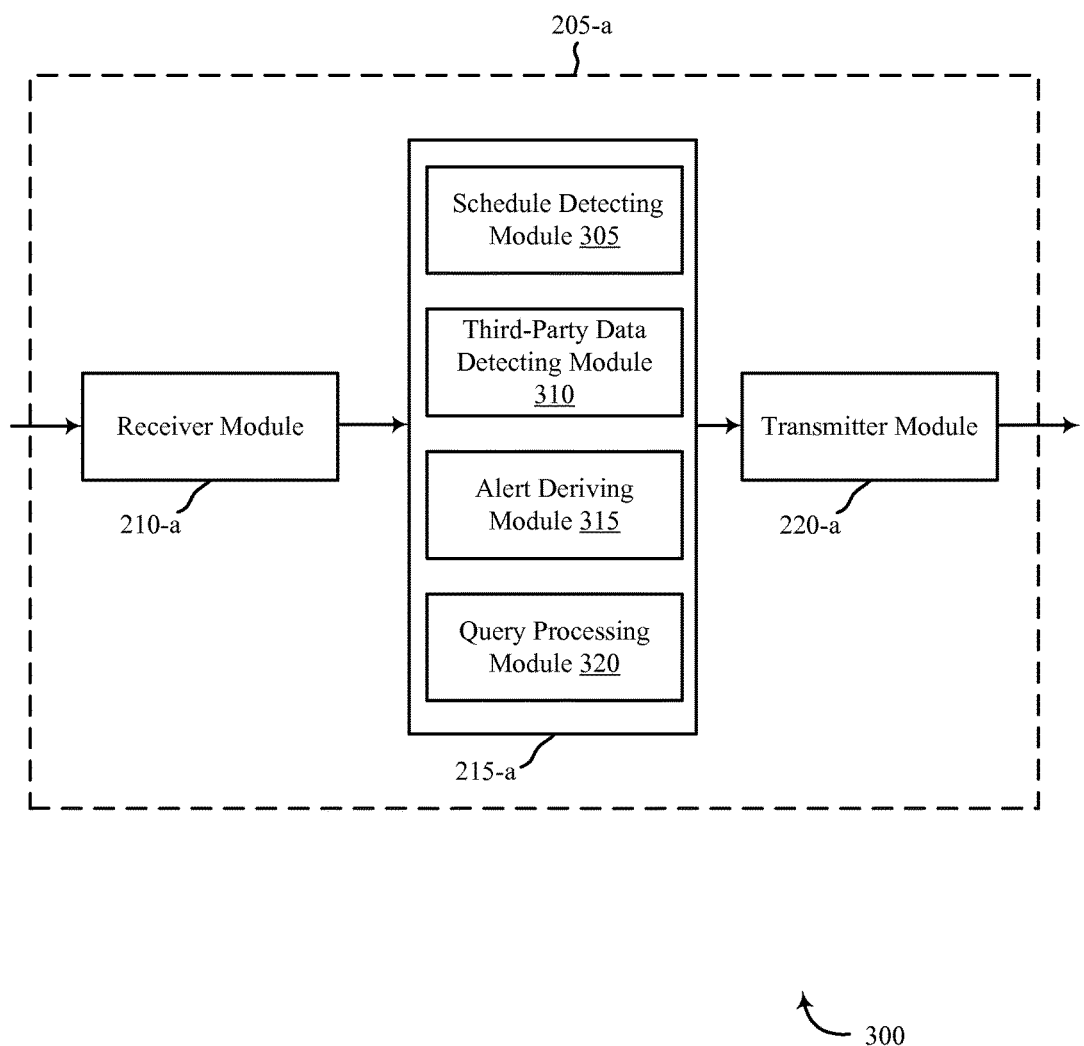
FIG. 3 shows a block diagram of a device relating to a security and/or an automation system, in accordance with various aspects of this disclosure.

FIG. 3 shows a block diagram 300 of an apparatus 205-a for use in security and/or automation systems, in accordance with various examples. The apparatus 205-a may be an example of one or more aspects of a control panel 125, a local computing device 105, 110, or a remote computing device 130, as described with reference to FIG. 1. Apparatus 205-a may also be an example of an apparatus 205 described with reference to FIG. 2. The apparatus 205-a may include a receiver module 210-a, a comparing module 215-a, and/or a transmitter module 220-a, which may be examples of the corresponding modules of apparatus 205. The apparatus 205-a may also include a processor. Each of these components may be in communication with each other. The comparing module 215-a may include any one or more of a schedule detecting module 305, a third-party data detecting module 310, an alert deriving module 320, and a query processing module 315. The receiver module 210-a and the transmitter module 220-a may perform the functions of the receiver module 210 and the transmitter module 220 of FIG. 2, respectively.

The components of the apparatus 205-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

As discussed above with respect to FIG. 2, receiver module 210-a may be operable to receive scheduling data and/or third-party data from one or more of a local computing device, remote computing device, control panel, server, or other online source. For example, receiver module 210-a may receive a schedule or calendar update for a first user, a separate schedule for a second user, and traffic data from a third-party data source, such as a mapping application. Receiver module 210-a may receive data continuously, at discrete intervals, or in some examples may query outside resources for updates in scheduling and/or third-party data. Data received at receiver module 210-a may be communicated to comparing module 215-a for processing.

Comparing module 215-a may process the user scheduling and/or third-party data received from receiver module 210-a in order to derive an alert condition. In particular, schedule detecting module 305 may compile received scheduling data for one or more users, and may compare the compiled scheduling data in order to determine any potential conflicts, or to update a master schedule containing all users' most up-to-date schedules. For example, schedule detecting module 305 may receive a schedule for a first user and an update to a schedule for a second user; by comparing the two schedules, schedule detecting module 305 may determine that the updated schedule for the second user now conflicts with an appointment on the first user's schedule.

Third-party data detecting module 310 may similarly compile all received third-party data, and may compare the received third-party data with the received scheduling data in order to determine any potential alert conditions, or to update various details of scheduled events or appointments, such as transit time, weather alerts, information on family members or other users running late for scheduled events, and the like. For example, third-party data detecting module 310 may receive third-party data from a weather application indicating that a severe weather warning is in effect. Third-party data detecting module 310 may compare that weather data to received scheduling data to determine whether the areas affected by the severe weather warning are associated with any scheduled user activities, such as a soccer game.

Alert deriving module 315 may receive the compared data from the schedule detecting module 305 and third-party data detecting module 310, and may derive one or more alerts therefrom. In the example provided above, where schedule detecting module 305 has received scheduling data associated with first and second users, and comparison of that data has indicated a scheduling conflict, alert deriving module 315 may derive an alert to notify any of the first user, the second user, or a third, interested user of the scheduling conflict. In another example provided above, where third-party data detecting module 310 has received third-party data indicating that a severe weather warning is in effect, and where the third-party data detecting module 310 has compared that data to received user scheduling data to determine that a user's scheduled soccer game is located within the severe weather area, alert deriving module 315 may derive an alert notifying the user that the soccer game is likely to be delayed or canceled. In other examples, alert deriving module 315 may receive scheduling data from schedule detecting module 305 indicating that a user has an upcoming appointment, and third-party data from third-party data detecting module 310 indicating that, at the user's present location and time, with the addition of received traffic information, the user must leave within the next 10 minutes in order to reach her appointment on time. Alert deriving module 315 may accordingly derive an alert notifying the user that she should leave in the next 10 minutes in order to reach her appointment on time. Other examples and combinations are also envisioned.

Alert deriving module 315 may be operable to generate alerts based on received scheduling and third-party data, where the derived alerts may be generated at predetermined intervals or in response to updated received data. By contrast, query processing module 320 may be operable to generate scheduling reports or updates in response to user queries. For example, a user may input a command at a control panel or on his personal computing device or smartphone, inquiring as to his and/or his family's upcoming appointments. In response to the received command, query processing module 320 may pull the most current scheduling data from schedule detecting module 305 and the most up-to-date third-party data from third-party data detecting module 310, and may generate a scheduling report therefrom. For example, query processing module 320 may generate a report indicating the recent changes to the family schedule, including canceled appointments, rescheduled practices, current locations of family members indicating that they will be late to their respective appointments, and the like. Query processing module 320 may also include in the generated report relevant third-party data, such as traffic and weather conditions.

Transmitter module 220-a may receive one or more alerts generated by alert deriving module 315 and/or one or more scheduling reports from query processing module 320, and may communicate the alerts and/or reports to one or more users. For example, transmitter module 220-a may communicate a visual or auditory alert to one or more user at a control panel in the users' home. Alternatively or in addition, transmitter module 220-a may communicate a haptic alert, such as a vibration, at the one or more users' smartphones. Other combinations are also envisioned.

Figure 4:
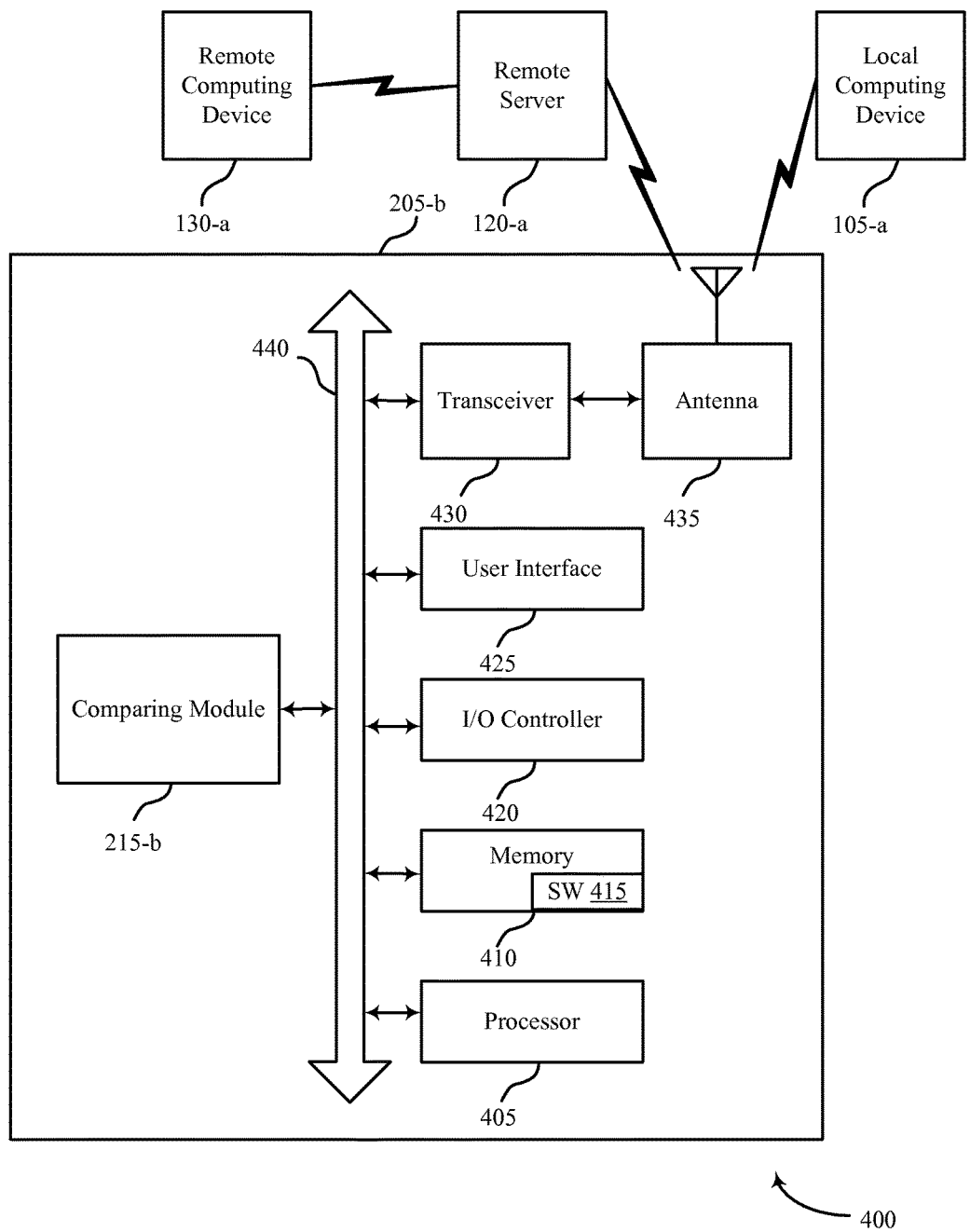
FIG. 4 shows a block diagram relating to a security and/or an automation system, in accordance with various aspects of this disclosure.

FIG. 4 shows a system 400 for use in security and/or automation systems, in accordance with various examples. System 400 may include an apparatus 205-b, which may be an example of any of the local computing devices 105, 110, remote computing device 130, or control panel 125 of FIG. 1. Apparatus 205-b may also be an example of one or more aspects of apparatus 205 and/or 205-a of FIGS. 2 and 3.

Apparatus 205-b may include comparing module 215-b, which may be an example of comparing module 215, 215-a described with reference to FIGS. 2-3. Apparatus 205-b may also include components for bi-directional voice and data communications including components for transmitting communications and components for receiving communications. For example, apparatus 205-b may communicate bi-directionally with one or more of local computing device 105-a, remote server 120-a, and/or remote computing device 130-a, which may be examples of local computing device 105, 110, remote server 120, and remote computing device 130-a of FIG. 1. This bi-directional communication may be direct (e.g., apparatus 205-b communicating directly with local computing device 105-a) or indirect (e.g., apparatus 205-b communicating indirectly with remote computing device 130-a through remote server 120-a).

The comparing module 215-b may be operable to receive scheduling data associated with one or more user and compare the received scheduling data to derive an alert. Additionally, comparing module 215-b may be operable to receive third-party data, and to compare the received third-party data with the received scheduling data in order to derive an alert, as described above with reference to FIGS. 2-3. For example, comparing module 215-b may receive a scheduling notification for a first user indicating that his field trip has been rescheduled, and may compare this rescheduling data with a second user's work schedule; based on this comparing, comparing module 215-b may determine a scheduling conflict, and may derive an alert therefrom. Comparing module 215-b may then communicate the derived alert to, for example, transceiver 430, such that the alert may be communicated to the second user and/or any other interested party.

Apparatus 205-*b* may also include a processor module 405, a memory 410 (including software/firmware code (SW) 415), an input/output controller module 420, a user interface module 425, a transceiver module 430, and one or more antennas 435, each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of local computing device 105-*a*, remote server 120-*a*, and/or remote computing device 130-*a*. The transceiver module 430 may include a modem to modulate the packets and provide the modulated packets to the one or more antennas 435 for transmission, and to demodulate packets received from the one or more antennas 435. While a control panel or a control device (e.g., 205-*b*) may include a single antenna 435, the control panel or the control device may also have multiple antennas 435 capable of concurrently transmitting or receiving multiple wired and/or wireless transmissions. In some embodiments, one element of apparatus 205-*b* (e.g., one or more antennas 435, transceiver module 430, etc.) may provide a direct connection to a remote server 145-*a* via a direct network link to the Internet via a POP (point of presence). In some embodiments, one element of apparatus 205-*b* (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTHC) and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of apparatus 205-*b* (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., receive scheduling data associated with one or more users, receive third-party data, compare the received scheduling data and/or third-party data, derive an alert, etc.). Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 may contain, among other things, the Basic Input-Output system (BIOS) which may control basic hardware and/or software operation such as the interaction with peripheral components or devices. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to, or may be included as, one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems may be interconnected in different ways from that shown in FIG. 4. In some embodiments, an aspect of some operation of a system, such as that shown in FIG. 4, may be readily known in the art and is not discussed in detail in this application. Code to implement the present disclosure may be stored in a non-transitory computer-readable medium such as one or more of system memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the apparatus 205-*b* may include a single antenna 435, the apparatus 205-*b* may have multiple antennas 435 capable of concurrently transmitting and/or receiving multiple wireless transmissions.

Figure 5:
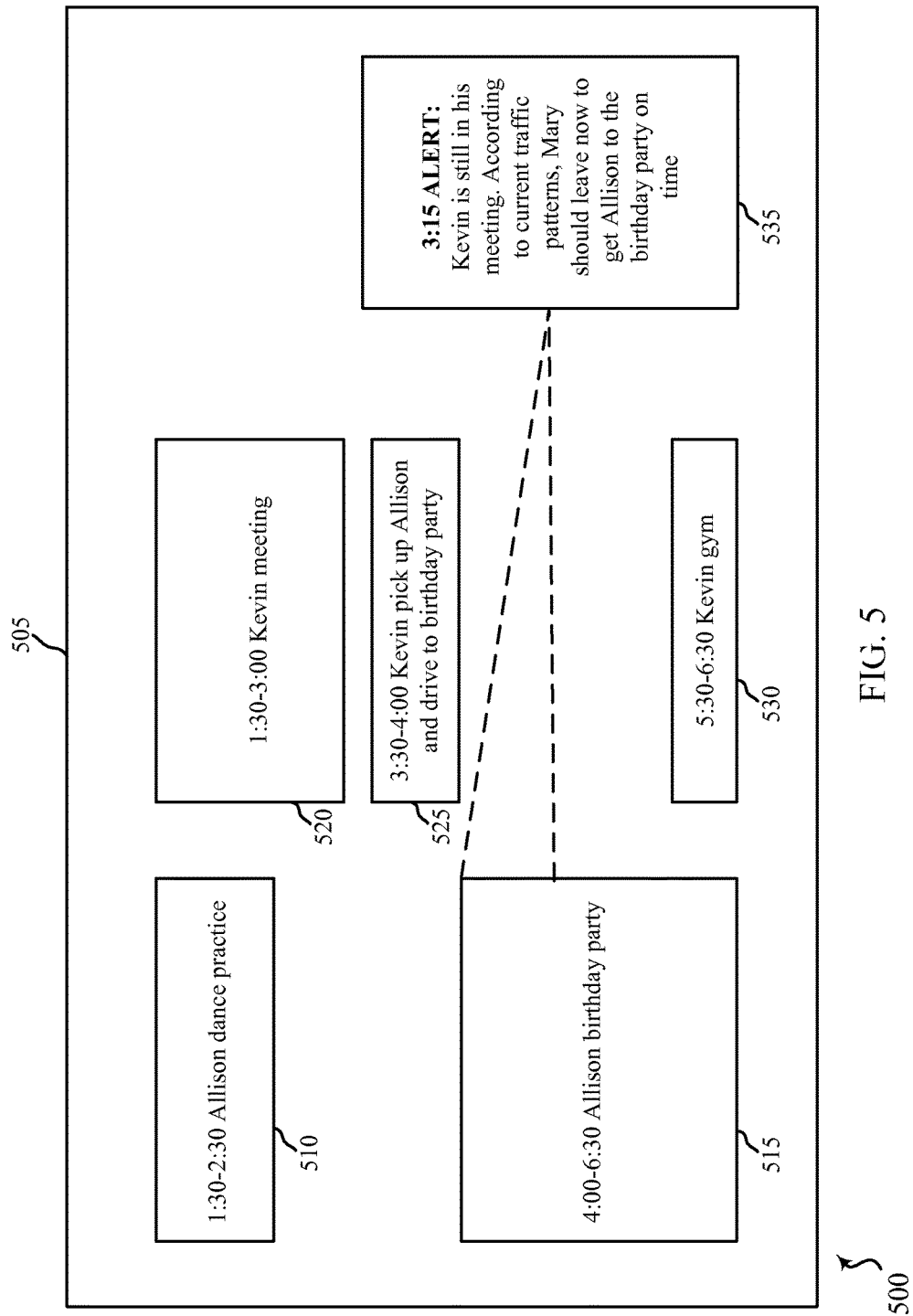
FIG. 5 shows a block diagram of an example user interface relating to a security and/or an automation system, in accordance with various aspects of this disclosure.

FIG. 5 is a block diagram 500 illustrating an example user interface associated with an example method for a security and/or automation system, in accordance with various embodiments of the present disclosure. User interface 505 may be an example of a display on any of a control panel, local computing device, or remote computing device, as described above with reference to FIGS. 1-3. Where user interface 505 is displayed on a local or remote computing device, user interface 505 may be displayed as part of a designated application, or may be displayed on a web interface. User interface 505 may be displayed on a continuous or interval basis, or may be displayed in response to an inputted user request. Additionally, the content of user interface 505 may be updated continuously or at designated intervals, or may be updated in response to a received user request. A received user request may take the form of an inputted request, for example in the form of selection of a button or on-screen feature of the user interface 505, or in other examples may be a verbal or gestural command sensed by the control panel on which the user interface 505 is displayed.

User interface 505 may display a plurality of information associated with schedules and alerts for one or more users. In the illustrated example 500, user interface 505 is displaying scheduling information associated with a first user, Allison, and a second user, Kevin, and is displaying an alert message directed to a third user, Mary. In this example, Allison is scheduled for dance practice 510 from 1:30-2:30 pm, after which her father, Kevin, is scheduled to pick Allison up 525 to take her to a birthday party 515, where the birthday party 515 is scheduled to take place from 4:00-6:30 pm. After dropping Allison off at the birthday party 515, Kevin is scheduled to go the gym 530 from 5:30-6:30. The system has received third-party data associated with Kevin's current location, however, and has detected that, as of 3:15 pm, Kevin is still at his office in his meeting 520 originally scheduled from 1:30-3:00. Based upon third-party data including Kevin's current location, Allison's current location, the location of the birthday party, preferred or historically traveled routes between the three locations, and traffic information along these routes, the system has determined that Kevin is going to be late to pick Allison up for her birthday party 515. The system has accordingly derived an alert 535 to notify Allison's mother, Mary, that Kevin is still in his meeting, and that Mary should take Allison to her birthday party now if they are to reach the party on time. This alert condition may have been generated automatically, or may have been generated in response to an inputted inquiry from Mary, for example at the home automation system control panel or at her smartphone. In this way, Mary may stay apprised of scheduling conflicts and updates without the need to contact each family member individually to discover his or her location and status.

In other examples, user interface 505 may display a single, unified schedule compiling all family members' calendars, where the unified schedule may be updated continuously or on an interval basis to reflect scheduling changes or changes in user status or other third-party data that may impact scheduled appointments.

Figure 6:
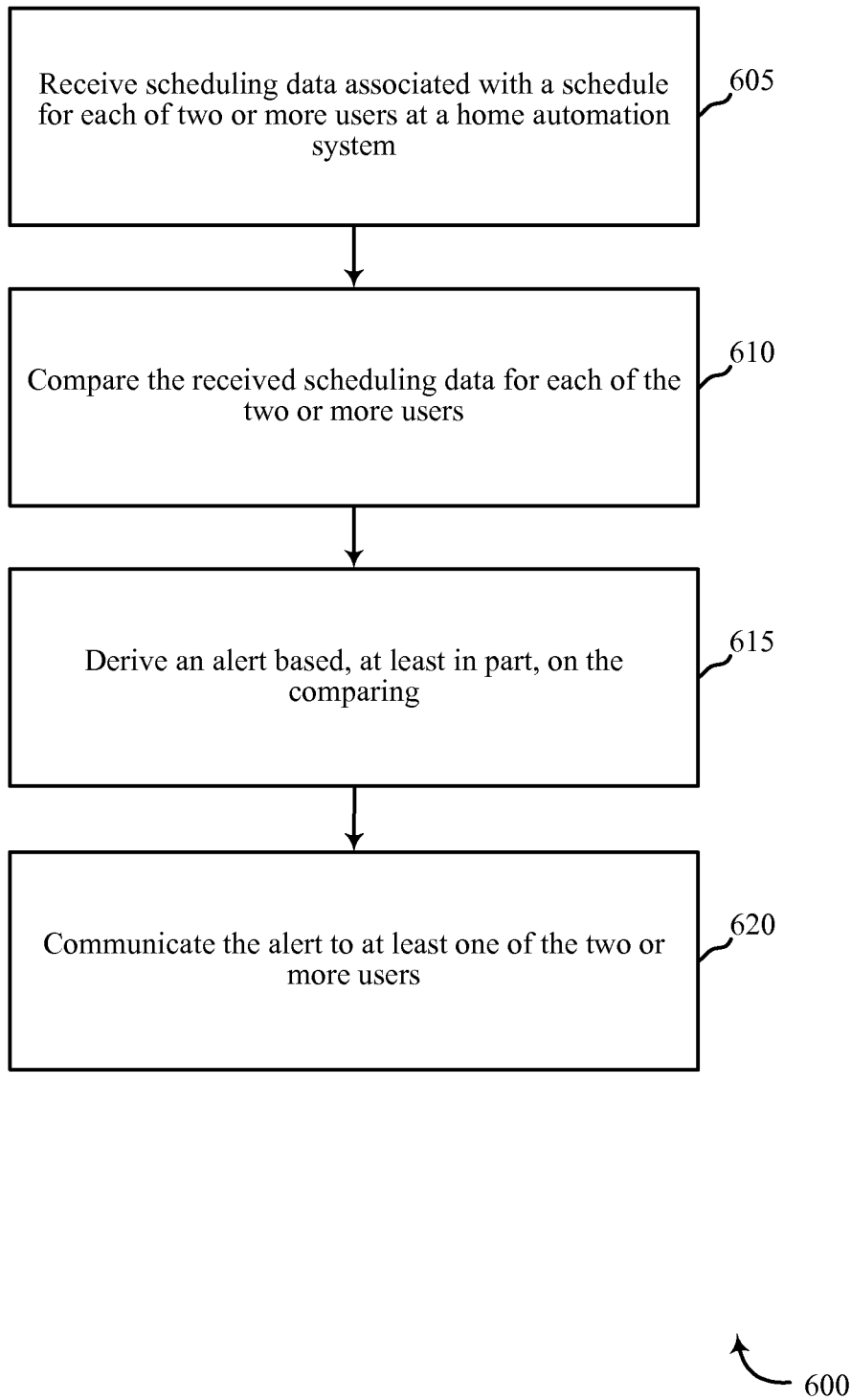
FIG. 6 is a flow chart illustrating an example of a method relating to a security and/or an automation system, in accordance with various aspects of this disclosure.

FIG. 6 is a flow chart illustrating an example of a method 600 for security and/or automation systems, in accordance with various aspects of the present disclosure. For clarity, the method 600 is described below with reference to aspects of one or more of the local computing devices 105, 110, control panel 125, and/or remote computing device 130 described with reference to FIGS. 1-4, and/or aspects of one or more of the apparatus 205, 205-*a*, or 205-*b* described with reference to FIGS. 1-4. In some examples, a control panel, local computing device, and/or remote computing device may execute one or more sets of codes to control the functional elements described below. Additionally or alternatively, the control panel, local computing device, and/or remote computing device may perform one or more of the functions described below using special-purpose hardware.

At block 605, the method 600 may include receiving scheduling data associated with a schedule for each of two or more users at a home automation system. The scheduling data may be pulled from one or more user schedule locations, such as dedicated applications on user personal computing devices or smartphones, or from web-based applications. In other examples, the scheduling data may be manually inputted by the two or more users.

At block 610, the method 600 may include comparing the received scheduling data for each of the two or more users. This comparing may be a means to determine scheduling conflicts, or may be a means to compile and consolidate a plurality of user schedules into a single, up-to-date master schedule, or a combination thereof.

At block 615, the method 600 may include deriving an alert based, at least in part, on the comparing. For example, where, at block 610, it is determined that an event from a first user's schedule conflicts with an appointment from a second user's schedule, for example when the second user is intended to accompany the first user to the scheduled event, this conflict may indicate an alert event. Accordingly, an alert may be derived to notify one or both users, or a third, interested user, of the impending conflict.

At block 620, the method 600 may include communicating the alert to at least one of the two or more users. The alert may be communicated to the one or more users using any acceptable means, including communicating a visual, auditory, and/or haptic alert to a personal computing device or smartphone, or to a control panel in the one or more users' home. In some examples, the alert may be automatically communicated to the one or more users in response to a detected alert event, such as a scheduling conflict. In other examples, the alert may be generated and communicated in response to a received request for scheduling status from one or more user. For example, a user may speak a verbal command at a control panel in her home, requesting the status of her and her family's schedules. In response to the command, the home automation system may query the schedules for each family member, may compare the schedules, and may derive any alert conditions accordingly. In some examples, the location to which the alert is to be communicated may be determined based, at least in part, on detected occupancy data or patterns, in order to ensure that the derived alert reaches the intended recipient user. For example, the home automation system may detect, using any known means of occupancy detection, that a user is in the living room, and may broadcast the alert to a control panel located in the living room accordingly. In another example, the home automation system may detect that the home is unoccupied, and may accordingly communicate any derived alerts to the one or more users directly at remote computing devices or smartphones likely to be collocated with the users.

The operation(s) at blocks 605, 610, 615, and 620 may be performed using the receiver module 210, 210-*a*, the comparing module 215, 215-*a*, and/or the transmitter module 220, 220-*a*, described with reference to FIGS. 2-4.

Thus, the method 600 may provide for schedule monitoring methods for two or more users, relating to automation and/or security systems. It should be noted that the method 600 is just one implementation and that the operations of the method 600 may be rearranged or otherwise modified such that other implementations are possible.

Figure 7:
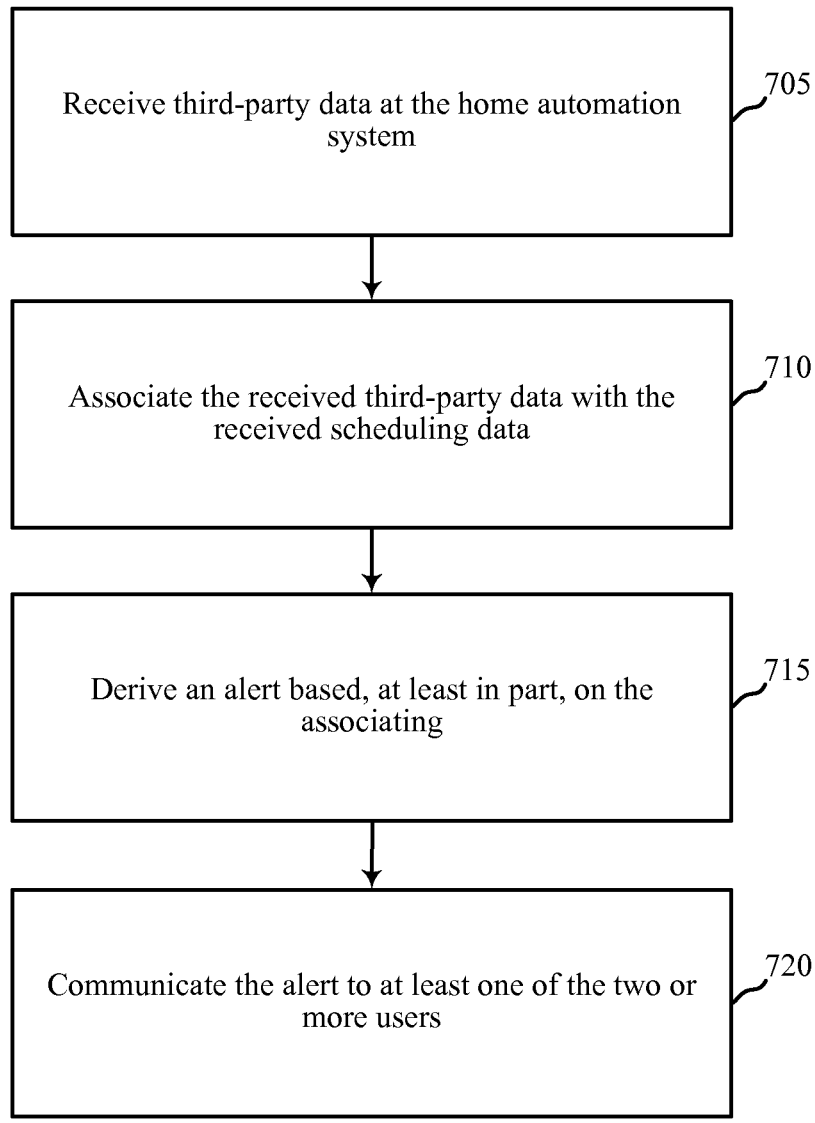
FIG. 7 is a flow chart illustrating an example of a method relating to a security and/or an automation system, in accordance with various aspects of this disclosure.

FIG. 7 is a flow chart illustrating another example of a method 700 for security and/or automation systems, in accordance with various aspects of the present disclosure. For clarity, the method 700 is described below with reference to aspects of one or more of the local computing devices 105, 110, control panel 125, and/or remote computing device 130 described with reference to FIGS. 1-4, and/or aspects of one or more of the apparatus 205, 205-*a*, or 205-*b* described with reference to FIGS. 1-4. In some examples, a control panel, local computing device, and/or remote computing device may execute one or more sets of codes to control the functional elements described below. Additionally or alternatively, the control panel, local computing device, and/or remote computing device may perform one or more of the functions described below using special-purpose hardware.

At block 705, the method 700 may include receiving third-party data at the home automation system. The third-party data may be pulled from a plurality of sources, such as personal computers, applications, web-based applications, and the like. For example, third-party data may include updated scheduling information extracted from the content of user emails. In other examples, third-party data may include traffic or weather data gathered from dedicated weather or map applications, or from online news sources or social media sites. In still other examples, third-party data may include location data for one or more user, pulled, for example, from integrated GPS systems in user smartphones. In any example, the third-party data may be automatically pushed to the home automation system, or may be pulled continuously or at predetermined intervals from the various third-party data sources. In other examples, third-party data may be requested in response to a user inputted scheduling inquiry, for example at a control panel for the home automation system.

At block 710, the method 700 may include associating the received third-party data with the received scheduling data. For example, traffic and user location data may be associated with user scheduling data for an upcoming appointment in order to determine timeliness, commuting times, and best routes. In other examples, weather data may be associated with a scheduled user event to predict possible cancellation or delay of the event.

At block 715, the method 700 may include deriving an alert based, at least in part, on the associating. In the above-provided example, where traffic and user location data is compared with scheduling data indicating an upcoming appointment, at block 715 it may be determined that the user must leave his current location in the next 15 minutes in order to reach his next appointment on time. Accordingly, an alert notifying the user of the impending need for departure may be generated. In another example, as discussed above, where at block 720 it is determined that a weather alert is in effect for a location at which a user has a scheduled soccer game, at block 715 an alert may be generated notifying the user that his soccer game is likely to be delayed or canceled. As discussed above with respect to FIG. 6, the alert may be automatically generated in response to received third-party data and user scheduling data, or may be generated based on a request for a schedule status update by a user at, for example, a control panel.

At block 720, the method 700 may include communicating the alert to at least one of the two or more users. The alert may be communicated to the user at, for example, the user's smartphone or personal computer, or in other examples may be communicated to a control panel associated with the user's home automation system. The communicated alert may take the form of any one or more of a visual alert, an auditory alert, and/or a haptic alert. For example, the alert may be communicated in the form of a text message or other dialogue box at the user's smartphone. In other examples, an auditory alert may be broadcasted from the user's home automation system control panel.

In some examples, aspects methods 600 and 700 may be combined and/or separated. It should be noted that the methods 600 and 700 are just example implementations, and that the operations of the methods 600-700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for security and automation systems, comprising:
   receiving, at a control panel of a security and automation system, scheduling data associated with a schedule for each of two or more users at a home automation system, the scheduling data indicating an event associated with a first user and a second user of the two or more users;
   receiving current weather data from a third-party data source;
   comparing the current weather data to the received scheduling data associated with the schedule for each of the two or more users;
   estimating an amount of time of the first user of the two or more users to travel from a current location of the first user to the event associated with the first user and the second user based at least in part on the current weather data;
   receiving, from at least one of the first user or the second user of the two or more users, a request for a status update indicating whether the first user will be late to the event and comprising updated scheduling data of the first user;
   predicting a cancellation or a rescheduling of the event associated with the first user and the second user based at least in part on the comparing the current weather data to the received scheduling data;
   deriving, in response to receiving the request for the status update, an alert comprising the status update based at least in part on the predicting the cancellation of the event associated with the first user and the second user and the estimated amount of time of the first user to travel from the current location to the event; and
   communicating, by the control panel of the security and automation system, the alert to at least the first user and the second user of the two or more users based at least in part on receiving the request for the status update from at least one of the first user or the second user of the two or more users.

2. The method of claim 1, further comprising:
   receiving updated scheduling data associated with the schedule for at least one of the two or more users at the home automation system; and
   deriving an updated alert based, at least in part, on the received updated scheduling data.

3. The method of claim 2, wherein the updated scheduling data is received at any of predetermined intervals, on a continuous basis, in real-time, or in response to a request, or a combination thereof.

4. The method of claim 1, further comprising:
receiving third-party data at the home automation system;
associating the received third-party data with the received scheduling data;
deriving the alert based, at least in part, on the associating; and
communicating the alert to at least one of the two or more users.

5. The method of claim 1, wherein communicating the alert comprises any of broadcasting the alert at the home automation system or communicating the alert to a remote computing device, or a combination thereof.

6. The method of claim 1, further comprising:
receiving a command at the home automation system comprising the request for the status update;
deriving the status update associated with the received scheduling data for the two or more users; and
communicating the derived status update to at least one of the two or more users.

7. The method of claim 6, wherein communicating the derived status update comprises any of providing, at the home automation system, a visual display, an auditory display, or a haptic display, or a combination thereof.

8. The method of claim 4, wherein the third-party data comprises any of current traffic data, historical traffic data, current location data for each of the two or more users or historical commuting time data, or a combination thereof.

9. The method of claim 1, wherein the scheduling data associated with the schedule for each of the two or more users is received from any of a digital calendar or manual user input, or a combination thereof.

10. The method of claim 1, wherein the alert is further derived based, at least in part, on one or more inputted user preferences.

11. An apparatus for a security and automation systems system, comprising:
a processor;
memory in electronic communication with the processor; and
instructions stored in the memory, the instructions being executable by the processor to:
receive, at a control panel of the security and automation system, scheduling data associated with a schedule for each of two or more users at a home automation system, the scheduling data indicating an event associated with a first user and a second user of the two or more users;
receive current weather data from a third-party data source;
compare the current weather data to the received scheduling data associated with the schedule for each of the two or more users;
estimate an amount of time of the first user of the two or more users to travel from a current location of the first user to the event associated with the first user and the second user based at least in part on the current weather data;
predict a cancellation or a rescheduling of the event associated with the first user and the second user based at least in part on the comparing the current weather data to the received scheduling data;
receive, from at least one of the first user or the second user of the two or more users, a request for a status update indicating whether the first user will be late to the event and comprising updated scheduling data of the first user;
derive, in response to receiving the request for the status update, an alert comprising the status update based at least in part on the predicting the cancellation of the event associated with the first user and the second user and the estimated amount of time of the first user to travel from the current location to the event; and
communicate, by the control panel of the security and automation system, the alert to at least the first user and the second user of the two or more users based at least in part on receiving the request for the status update from at least one of the first user or the second user of the two or more users.

12. The apparatus of claim 11, wherein the processor is further configured to:
receive updated scheduling data associated with the schedule for at least one of the two or more users at the home automation system; and
derive an updated alert based, at least in part, on the received updated scheduling data.

13. The apparatus of claim 12, wherein the updated scheduling data is received at any of predetermined intervals, on a continuous basis, in real-time, or in response to a request, or a combination thereof.

14. The apparatus of claim 11, wherein the processor is further configured to:
receive third-party data at the home automation system;
associate the received third-party data with the received scheduling data;
derive the alert based, at least in part, on the associating; and
communicate the alert to at least one of the two or more users.

15. The apparatus of claim 14, wherein communicating the alert comprises any of broadcasting the alert at the home automation system or communicating the alert to a remote computing device, or a combination thereof.

16. The apparatus of claim 11, wherein the processor is further configured to:
receive a command at the home automation system comprising the request for the status update;
derive the status update associated with the received scheduling data for the two or more users; and
communicate the derived status update to at least one of the two or more users.

17. The apparatus of claim 16, wherein communicating the derived status update comprises any of providing, at the home automation system, a visual display, an auditory display, or a haptic display, or a combination thereof.

18. The apparatus of claim 14, wherein the third-party data comprises any of current traffic data, historical traffic data, current location data for each of the two or more users, or historical commuting time data, or a combination thereof.

19. The apparatus of claim 11, wherein the scheduling data associated with the schedule for each of the two or more users is received from any of a digital calendar or manual user input, or a combination thereof.

20. A non-transitory computer-readable medium storing computer-executable code for a security and automation system, the code executable by a processor to:
receive, at a control panel of the security and automation system, scheduling data associated with a schedule for each of two or more users at a home automation system, the scheduling data indicating an event associated with a first user and a second user of the two or more users;

receive current weather data from a third-party data source;

compare the current weather data to the received scheduling data associated with the schedule for each of the two or more users;

estimate an amount of time of the first user of the two or more users to travel from a current location of the first user to the event associated with the first user and the second user based at least in part on the current weather data;

predict a cancellation or a rescheduling of the event associated with the first user and the second user based at least in part on the comparing the current weather data to the received scheduling data;

receive, from at least one of the first user or the second user of the two or more users, a request for a status update indicating whether the first user will be late to the event and comprising updated scheduling data of the first user;

derive, in response to receiving the request for the status update, an alert comprising the status update based at least in part on the predicting the cancellation of the event associated with the first user and the second user and the estimated amount of time of the first user to travel from the current location to the event; and communicate, by the control panel of the security and automation system, the alert to at least the first user and the second user of the two or more users based at least in part on receiving the request for the status update from at least one of the first user or the second user of the two or more users.

* * * * *